July 30, 1940.  C. D. HALL ET AL  2,209,885
HYDRAULIC ROD LINE JACK
Filed April 11, 1938 5 Sheets-Sheet 1
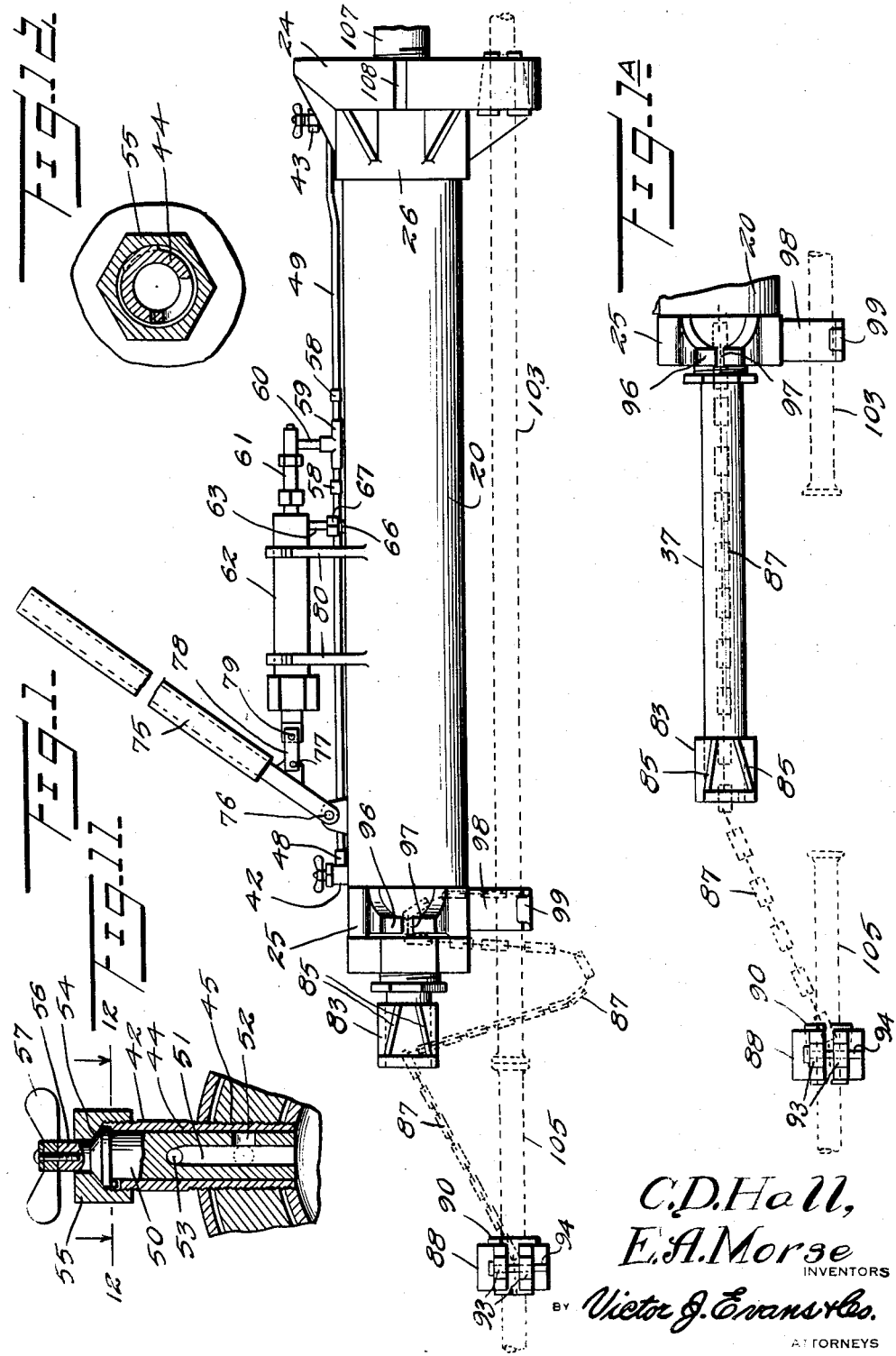
C.D. Hall,
E.A. Morse
INVENTORS
BY Victor J. Evans & Co.
ATTORNEYS July 30, 1940.    C. D. HALL ET AL    2,209,885
HYDRAULIC ROD LINE JACK
Filed April 11, 1939    5 Sheets-Sheet 2
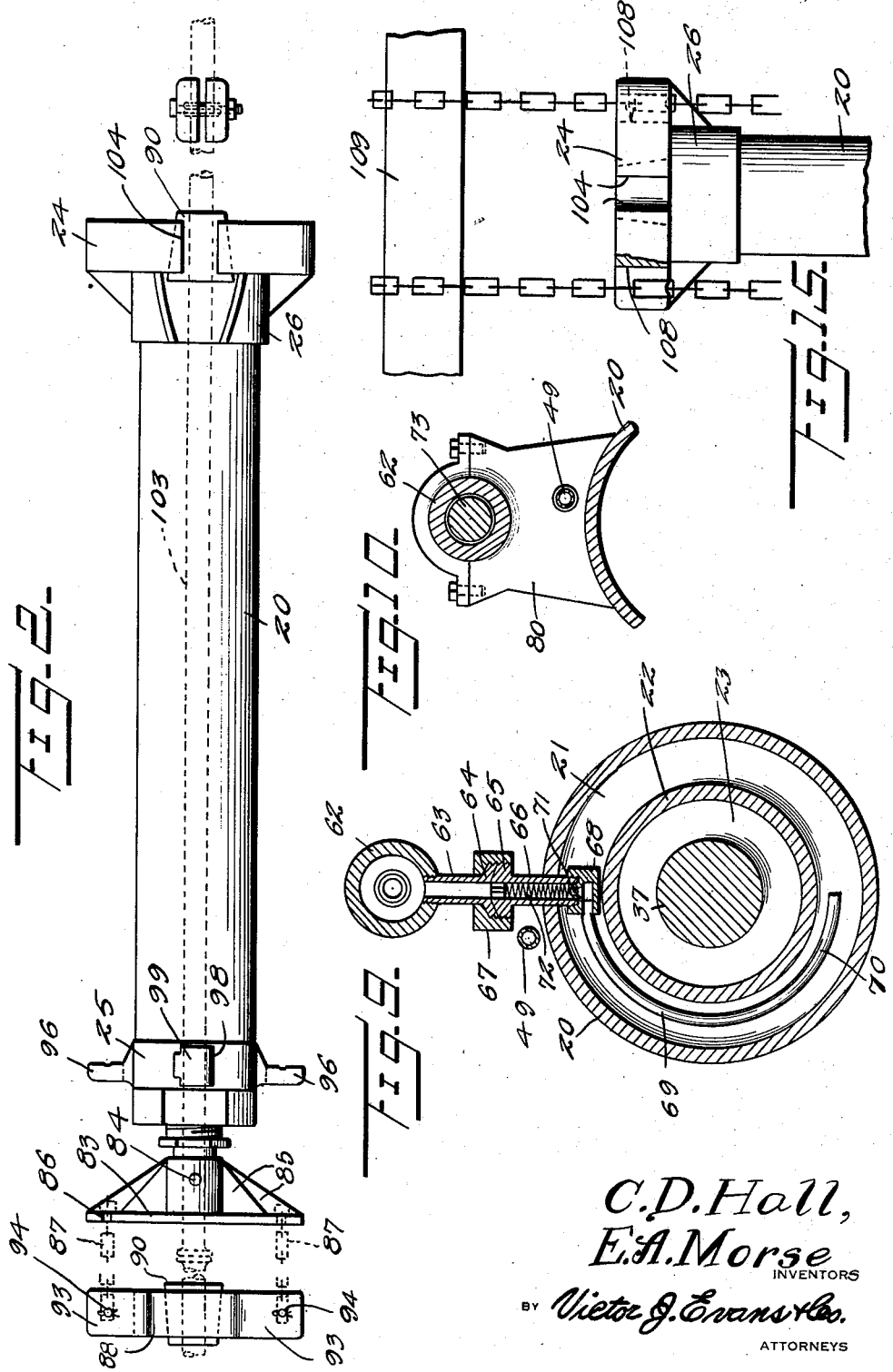
C.D. Hall,
E.A. Morse
INVENTORS
BY Victor J. Evans & Co.
ATTORNEYS

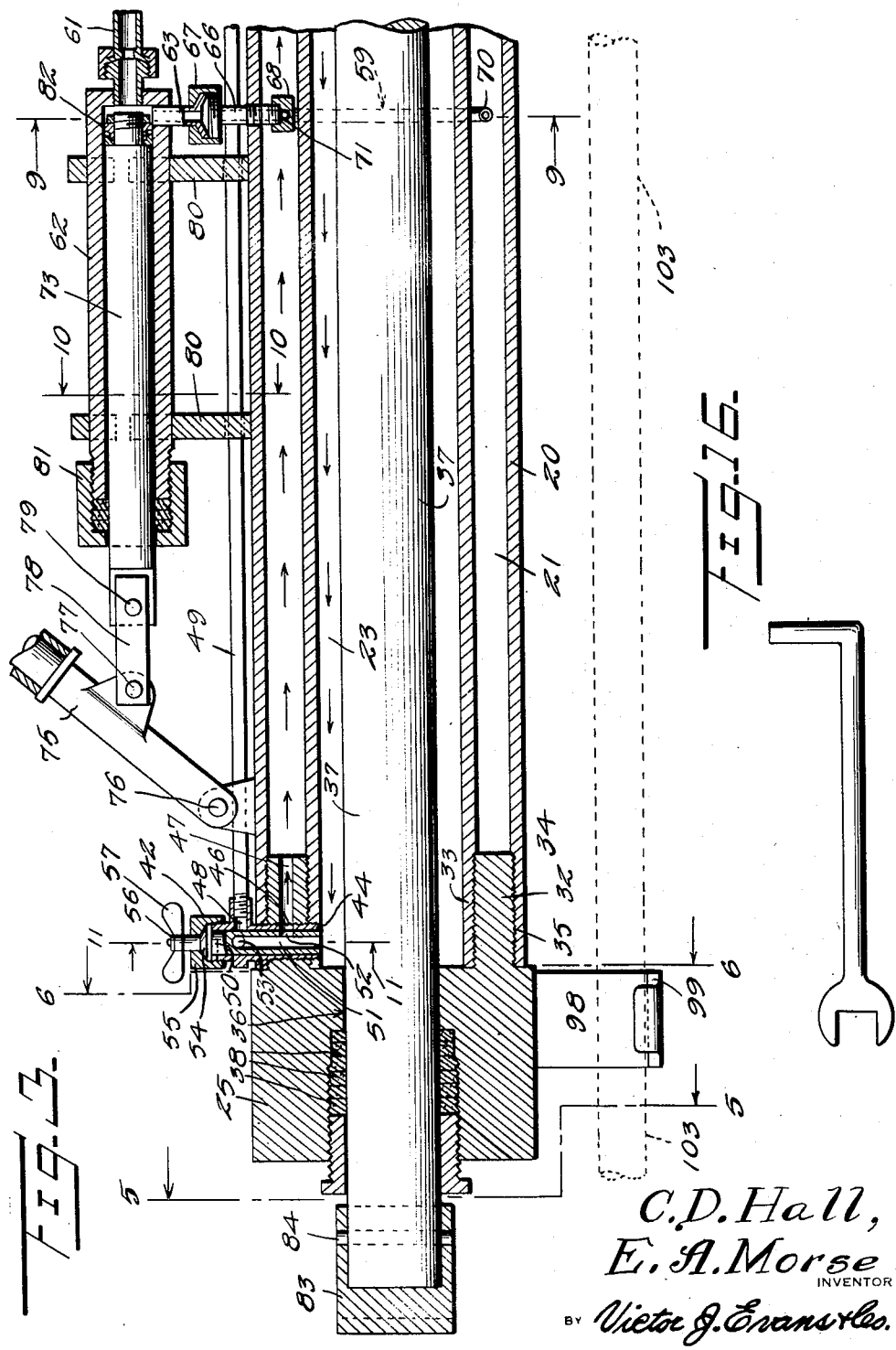

July 30, 1940.  C. D. HALL ET AL  2,209,885
HYDRAULIC ROD LINE JACK
Filed April 11, 1938   5 Sheets-Sheet 4
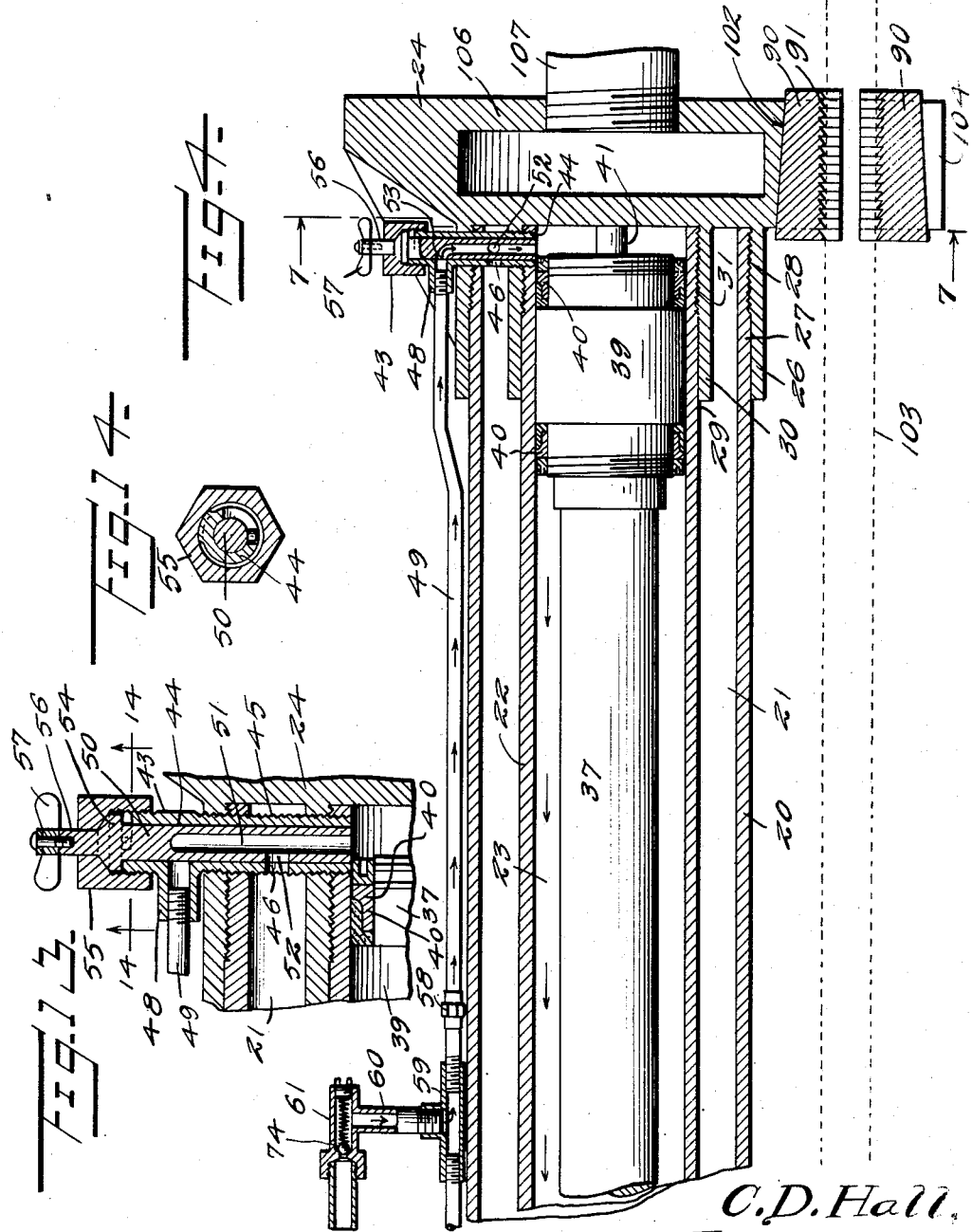
C.D. Hall,
E.A. Morse
INVENTORS
BY Victor J. Evans
ATTORNEYS

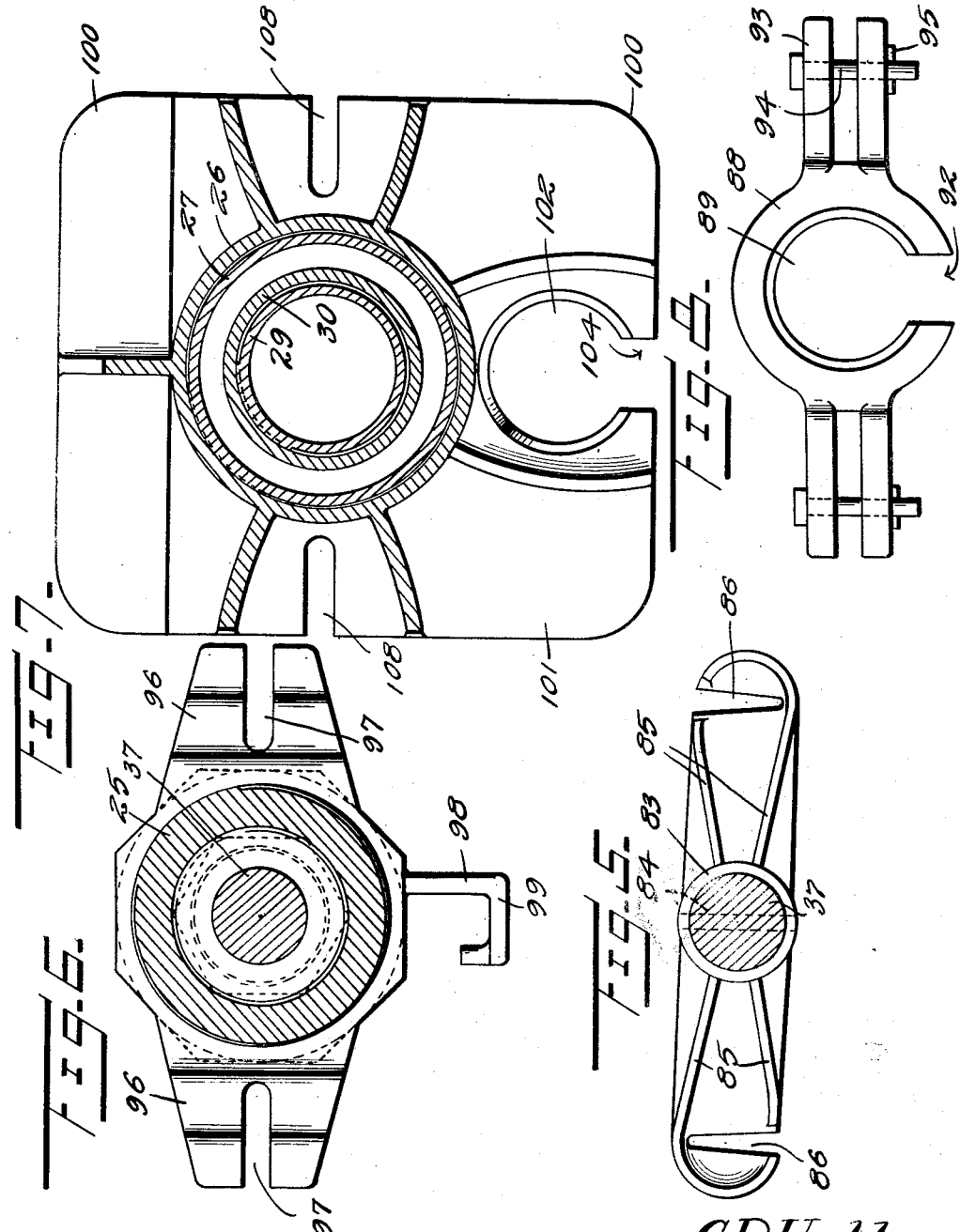

Patented July 30, 1940

2,209,885

UNITED STATES PATENT OFFICE 2,209,885

HYDRAULIC ROD LINE JACK

Clarence D. Hall and Ercy A. Morse, Pampa, Tex.

Application April 11, 1938, Serial No. 201,390

7 Claims. (Cl. 254—29)

This invention relates to hydraulic rod line jacks and more particularly to a device for effecting the coupling of the pump-operating rod line for oil well pumps and the like, but without absolute limitation thereto.

The invention has for its principal object to produce a simple yet effective and practical portable device, of great power and yet easily adjusted and manipulated with slight physical exertion on the part of the operator.

Another object is to produce a device of this character which is readily adaptable for various pulling and hoisting purposes.

With these and other objects to be attained, as will hereinafter more fully appear, the invention consists in the general structure and in the parts and combinations and arrangements of parts thereof as hereinafter described and pointed out with particularity in the appended claims, reference being had to the accompanying drawings forming a part of this specification, and in which—

Figure 1 is a side elevation of the device with the plunger element retracted;

Figure 1A is a fragmentary view, in side elevation, showing the plunger element extended;

Figure 2 is an inverted plan view of the device with the plunger element retracted as in Figure 1;

Figure 3 is a longitudinal section, on an enlarged scale, of the forward end portion of the device;

Figure 4 is a similar view of the rear end portion of the device;

Figure 5 is a cross section taken substantially on the line 5—5 of Figure 3;

Figure 6 is a cross section on the line 6—6 of Figure 3;

Figure 7 is a cross section on the line 7—7 of Figure 4;

Figure 8 is a detailed view of the slip spider element;

Figure 9 is a section on the line 9—9 of Figure 3;

Figure 10 is a section on the line 10—10 of Figure 3, illustrating the pump mounting;

Figure 11 is a detail sectional view, on an enlarged scale, on the line 11—11 of Figure 3;

Figure 12 is a section on the line 12—12 of Figure 11;

Figure 13 is an enlarged detail sectional view of the rear switch valve shown in Figure 4;

Figure 14 is a section on the line 14—14 of Figure 13;

Figure 15 is a schematic view illustrating the suspension of the device when used as a hoist; and Figure 16 is a detail view of a special wrench for use in connection with the device;

Referring now to the drawings, the pulling device or jack therein illustrated, comprises an outer body cylinder 20 constituting the main liquid reservoir 21, and a concentric inner tube 22 constituting a plunger chamber 23, said tubes 20 and 22 being closed at their rear ends by a common head 24 and at their front ends by a common head 25, each of which has peculiar structural characteristics to be later more fully described.

As shown, the rear head element 24 is formed with a forwardly extending annular flange or collar portion 26 in which the rear end portion 27 of the outer cylinder 20 is received with a leak-tight fit and secured throughout a portion of the overlapping length thereof with a screw threaded engagement, as at 28, while the adjacent end portion 29 of the inner cylinder 22 is similarly received in an inner collar portion 30 of said head element 24 and secured by a screw threaded engagement, as at 31.

The forward head element 25, as shown, is formed with a single annular extension or collar 32 at its inner side, said collar 32 being screw threaded interiorly to receive the correspondingly externally screw threaded portion 33 of said inner cylinder 22, and the adjacent end portion 34 of the outer cylinder 20 being internally screw threaded and secured on the correspondingly externally screw threaded circumferential face of said collar portion 32, as at 35.

The rear head element 24 is closed throughout the entire extent thereof, but the forward head 25 is provided with an axial bore 36 through which a plunger 37 works, and suitable packing 38 is provided in the head 25 for said plunger. At the inner end of the plunger 37 is a piston 39 which is provided on opposite sides with suitable packing rings 40, and at the extreme end of the plunger 37 is an axial stop lug 41 which comes in contact with the adjacent face of the head element 24 and holds the piston 39 away from the head element so as to provide a fluid space between the end of the piston and the head element when the plunger is at the limit of its inward movement.

Normally, the annular space 21 between the outer cylinder 20 and inner cylinder 22 and also the space 23 between the inner cylinder 22 and plunger 37, throughout the entire length of the device, is filled with a suitable non-compressible liquid, and the plunger is reciprocated by the displacement of the liquid from one side of the piston 39 to the other under pressure by means to be now described.

At the forward end portion of the device is a valve element designated generally by the numeral 42 and hereinafter referred to as the forward switching valve, while at the rear end portion of the device is a similar valve 43 hereinafter referred to as the rear switching valve. These two valves are substantially the same in structure except as to certain dimensions and reversed operation incidental to their respective locations at opposite ends of the device. Each comprises a tubular body 44 which is externally screw threaded throughout the major portion of its length, as at 45, so as to extend through registered screw threaded openings provided therefor in the adjacent end portions of the inner and outer body cylinders 20 and 22 and the respective attaching flanges of the head elements 24 and 25, so that said tubular body portions 44 communicate with the inner piston chamber 23. Adjacent the inner ends of the tubular body 44 is a lateral port opening 46, said opening 46 of the rear switching valve opening directly into the annular chamber or main liquid reservoir 21 between the outer and inner cylinders 20 and 22, and the corresponding port opening of the forward switching valve being in communication with said main reservoir chamber 21 through a port 47 provided therefor in the collar portion 32 of the forward head element 25.

Outside of the outer cylinder 20, each valve body 44 is provided with a lateral nipple extension 48, said nipple extensions 48 of the front and rear switching valves being connected by a pipe 49, which latter is connected laterally intermediate its ends to a pump as will presently more fully appear.

In each of the tubular valve bodies 44 is a rotatable plug 50 having an axial bore 51 in its lower end portion and a port 52 which is alternately brought into register with the port 46 of the valve body 44, while at the upper end of the bore 51 is a lateral port 53 which is disposed at an angle of 90 degrees to the opening 52 and positioned to be brought into registration with the opening of the nipple extension 48 of said valve body 44, whereby communication is established between said bore 51 of the valve plug 50 and said pipe connection 49, at which time, of course, the port 52 has been moved out of registry with the port 46, and vice versa.

In order to retain the plug member 50 rotatively within the valve body tube 44, said plug is provided at its upper end with an annularly shouldered and end-tapered head portion 54 over which is placed a cap-nut 55 which is screw threaded onto the upper end portion of the valve body 44, the plug member having an axial stem 56 which is provided with lateral wing portions 57 for convenience in manipulating said valve plug 50.

At a point between its ends, the pipe 49 is interrupted in its length and connected by suitable unions 58 to a T-coupling 59 whose stem portion 60 is in turn connected to a check valve extension 61 from a pump cylinder 62, by which provision liquid from the pump cylinder 62 is forced through the pipe 49 and either the forward switching valve 42 or the rear switching valve 43, depending upon which of said valves has been turned to bring its ports 48 and 53 into communication, and through the set valve 42 or 43 into the inner chamber 23 of the device.

Near the end of the pump cylinder 62 where the check valve extension 61 is attached, is an inlet nipple 63 having a flanged outer end portion 64 which is flared to receive a counterpart head 65 on a nipple extension 66 from the outer cylinder 20, said portions 64 and 65 being secured together by a coupling member 67. The nipple member 66 has its inner end extended into the annular chamber 21 between the outer cylinder 20 and inner cylinder 22 where it has a coupling member 68 attached thereto, said coupling member 68 carrying an arcuate suction tube 69 which is extended around one side of the inner cylinder 22 and terminates with its lower end portion 70 diametrically beneath said inner cylinder 22, as shown in Figures 3 and 9.

The coupling member 68 is provided with a seat for a ball check valve 71 which is normally urged against the seat by spring 72 located within the nipple extension 66, said valve 71 opening towards the pump cylinder 62 when the piston 73 in the pump cylinder 62 is moved on its suction stroke, at which time a spring pressed ball check valve 74 is held to its seat in the check valve extension 61 which is connected through the T-coupling 59 to the pipe 49 as hereinbefore described, and during this suction stroke of the pump piston 73 liquid from the lower portion of the main reservoir or chamber 21 is drawn into the cylinder 62 through said arcuate suction pipe 70. At the same time, hydraulic pressure is relieved in the inner chamber 23 at the side of the plunger piston 39 according to which one of the switching valves 42 or 43 has been set to establish communication between said inner chamber 23 and said outer chamber 21. For example, as shown in the correlated Figures 3 and 4, the forward valve 42 has been set for such communication between said inner and outer chambers and at the same time cutting off communication between the valve 42 and the adjacent end portion of the pipe 49, while the rear valve 43 has been set to cut off communication between said chambers 21 and 23 but to establish communication between the adjacent rear end portion of said pipe 49 and the inner chamber 23. Hence, when the pump piston 73 is moved on its compression stroke, the liquid in the cylinder 62 is forced out through the check valve extension 61, connection 60 and T-coupling 59, and thence through the pipe 49 and valve 43 into the inner chamber 23 between the piston 39 of the plunger 37 and the rear head element 24, whereby, upon repeated operation of the pump piston 73, hydraulic pressure is built up in the chamber 23 between the plunger piston 39 and head element 24 sufficiently to move the plunger 37 forwardly, the displaced liquid ahead of the piston 39 being forced out of the chamber 23 through the registered valve ports 52 and 46 and the port 47 in the collar portion 32 in the forward head element 25 into the main reservoir or chamber 21 to take the place of the liquid drawn out of said chamber 21 through said suction pipe 69 during the pumping operation.

Any suitable power element for operating the pump plunger 73 may be provided, but, as shown, an elongated lever member 75 is pivotally mounted on the forward end portion of the outer cylinder 20, as at 76, said lever member being pivotally connected, as at 77, to a pitman 78, which latter is in turn pivotally connected, as at 79, to the outer end portion of said pump piston 73. In this connection, it is noted that the pump cylinder 62 is rigidly supported on a pair of upstanding bracket extensions 80 at the top of the outer cylinder 2 and there being packing means of any suitable character provided at the forward end of the cylinder 62 for said pump piston 73, as at 81, and also on the inner end of the piston 73 within the cylinder 62, as at 82.

By the foregoing, it is noted that a simple yet powerful and highly effective hydraulic mechanism is produced which is readily adjusted and manually operated for moving the piston element 37 in either direction, at will, with minimum physical exertion on the part of the operator and with ample power to pull well pump operating rods and the like together for the purpose of coupling them as will presently more fully appear.

As the apparatus has been brought about more particularly for the purposes just above noted, but without absolute limitation thereto as first herein pointed out, the plunger element 37 is provided at its outer end with a cross-head 83 which may be secured firmly thereon in any desirable manner, but preferably by a cross-pin 84 whereby the head may be removed if necessary. The opposite lateral wings of this cross-head are suitably braced by ribs 85 and said wings are provided near their outer ends with open-ended slots 86 which are preferably flared slightly towards their open ends, said slots 86 being provided for the releasable inter-engagement of draft chains 87, which latter are attached at their ends to a spider element 88 which is attached to one of the rod sections that are to be drawn endwise together to be coupled. As shown, the spider element comprises a central hub portion having a tapered opening 89 for the reception of ordinary externally tapered slip elements 90 having internally toothed or serrated portions 91, the details of such slip elements being more clearly shown in Figure 4 in connection with the rear head element 24 as will be presently described.

To facilitate the application of the spider element 88 to a rod, said element is provided with an opening 92 at one side of its hub portion so that the spider may be slipped laterally onto the rod, after which the slips 90 are placed endwise in the central opening 89 and wedged between the tapered walls of said opening and the adjacent circumferential portion of the rod, it being understood, of course, that the width of the opening 92 is sufficient to receive rods of standard diameter.

In order to give ample strength to the spider element 88 and to afford convenient means of attachment of the chains 87 thereto, said element is preferably provided with spaced pairs of diametrically opposed ears 93, between which the ends of the chains 87 are placed and secured by headed pins or bolts 94 inserted through aligned apertures in said ears 93 and retained in place by transverse key-pins 95 (see Figure 8) or other suitable means.

The forward head element 25 is provided with lugs 96 on its opposite sides, said lugs having open ended diametrical slots 97 in which the portions of the chains 87 intermediate the cross-head 83 and their free ends may be detachably secured. So, too, said head element 25 is provided with a hooked extension 98 on its under side, the laterally turned lower end portion 99 of said extension 98 constituting a holder for one of the rod sections to be joined, as well as affording a substantial supporting foot for the forward end of the device in use.

The body of the rear head element 24 is of general rectangular form and of transverse dimensions considerably greater than the over-all diameter of the outer collar portion 26 which is attached to the outer cylinder 21, whereby to afford a substantial supporting base for the rear end portion of the device in use, but the corner portions are preferably rounded off, as at 100, or otherwise blunted so as to prevent injury to persons in transporting and handling the device in use. In the rectangular portion 101 at the side of the head element 24 on which the device is ordinarily supported in use is a tapered opening 102 similar to the opening 89 in the spider element 88 hereinbefore described for the reception of the rod retaining slips 90, it being, of course, understood that the taper of the opening 102 is reverse to that of the opening 89 in the ordinary use of the device for drawing two opposed rod sections endwise together.

For the purpose of illustrating the ordinary application of the device to one of the rod sections shown conventionally by dotted lines and designated by the numeral 103, and in the case of a pump operating rod line for oil wells and the like, said rod 103 being practically the one attached to the power device or prime mover and at the time held from endwise movement, is inserted laterally into the tapered opening 102 of the head portion 101 through an opening 104 provided in the head portion 101 similar to the opening 92 of the spider element 88, after which the rod 103 is tightened in place by the application of the slip elements 90 and the forward end portion of said rod 103 is placed on the hooked extension or foot portion 99. With the rod 103 thus positioned, and the plunger element 37 of the device moved forwardly to its extreme limit, and the spider element 88 having been applied to the opposed rod section 105 which is to be drawn to and coupled with the rod 103, chains 87 of sufficient length to span the gap between the cross-head 83 of the plunger element 37 and said spider element 88 on the rod 105 are carried from said spider element 88 to the cross-head 83 and secured in the slotted portions 86 of the latter, said chains, for practical purposes, being preferably of considerable excess length so as to be extended beyond said cross-head 83 to the forward head element 25 of the device so as to be engaged in the slotted portions 97 of said head element 25 when the plunger element is in the fully extended position as shown in the illustration in Figure 1A. With the chains thus attached, the switching valves 42 and 43 are set for the operation of moving the plunger element inwardly, which operation is accomplished by manual reciprocation of the pump piston 73 as hereinbefore described.

Should the distance between the two rods 103 and 105 that are to be connected, be greater than the length of travel of the plunger element 37 said plunger element has to be again operated and the operation repeated until the two rods have been brought together as shown in Figure 1. In this connection it is noted that the provision for attaching the chains 87 to the forward head element 25 is more particularly for the purpose of holding the rod 105 from moving backward under the pull of its connection with the usual pump jack mechanism or levers which operate the pump polish rods in the well and the like, until the plunger 37 has been again extended and the chains again attached to the cross-head 83 which is thereby connected closer to said spider element 88 with a correspondingly shorter length in the chain connection.

While the device will ordinarily be anchored by attachment of the rear head element 24 to the fixedly held rod section 103 as shown in Figures 1 and 4, by means of the slips 90, there may be some cases where it is desirable or necessary to otherwise anchor the device and at a point rearwardly remote therefrom, and for this purpose the rear head element 24 may be provided with an axial opening in its outer end wall 106 in which an extension rod or tube 107, of requisite length, may be attached by the screw threaded engagement, as shown, or otherwise as may be preferred. So, too, endwise anchorage of the device may be effected by means of chains or cables secured in diametrically opposed slotted portions 108 provided therefor at opposite sides of the head element 24. It is further noted that by the provision for the end anchorages just above described, the device may be suspended vertically from a suitable support 109, as illustrated more or less schematically in Figure 15, so as to be utilized as a hoist or for vertical rod or tube pulling operations and the like.

Obviously, the device admits of considerable modification structurally and also in its useful applications without departing from the spirit of the invention as defined by the appended claims. The invention, therefore, is not limited to the specific construction and arrangement shown in the accompanying drawings.

What is claimed is:

1. In a device of the character described for pulling a rod section to be joined with another rod section, a power unit including a reciprocatory plunger element, means for anchoring said power unit directly to the stationary rod section to be joined by the pulled section, a cross-head on said plunger element of the power unit, a separate spider element having means for releasable attachment to the pulled rod section, and a pair of flexible draft chains secured to said spider element at opposite sides of the attached rod section, said draft chains being carried rearwardly from said spider element and detachably secured intermediate their ends to the opposite end portions of said cross-head on the plunger element of the power unit, and means for detachably and adjustably connecting said chains to the opposite sides of the forward end portion of the power unit.

2. In a hydraulic rod line jack or the like, a hydraulic power unit having a longitudinal reciprocatory plunger element, said unit having head elements at its opposite ends with provision for supporting the unit in working position on the ground, the rear head element having an opening at one side thereof for lateral reception of a rod line with removable sectional slip means for detachably holding the rod line section in the opening and the front head element having provision for laterally receiving and loosely supporting the forward portion of said rod line section, a cross-head on the outer end of said plunger element of the unit, a spider element having an opening with provision for lateral rod reception with removable sectional slip means for attachment of the rod line section therein to be pulled, and flexible means for detachably connecting said spider element and said cross-head of the plunger element with lengthwise adjustment therebetween.

3. In an apparatus for pulling rod lines and the like, a power unit including an elongated body element having anchorage provision, a longitudinally reciprocable puller element mounted operably on and projected at one end beyond the adjacent end of said body element, means for selectively moving said puller element under power in either direction at will, a holder element attachable to the rod line or the like to be pulled, and an elongated flexible draft element secured at one end to said holder element and at a place remote from said end to the body element of the power unit and also secured at a place intermediate said end and remote place of attachment to the projected end of said puller element.

4. In an apparatus for pulling a rod line section to join it with another section, a power unit including an elongated body element having provision at its opposite ends for supporting in parallel relation thereto the rod line section to be joined by the pulled section, with means in the support for anchoring the body element to the supported rod line section, a longitudinally reciprocable puller element mounted operably on and projected at one end beyond the adjacent end of said body element, means on said body element for selectively moving said puller element under power in either direction at will, an attaching head on the projected end portion of said puller element, an attaching bracket extended laterally from the adjacent end portion of the body element, a holder element attachable to the rod line section to be pulled, and an elongated flexible draft element secured at one end to said holder element and at a place remote from said end to said lateral attaching bracket on the body element and also secured at a place intermediate said end and remote place of attachment to said attaching head on said puller element.

5. In an apparatus of the character described, a power unit with anchoring means, said unit including a longitudinal reciprocatory plunger element, said plunger element having a cross-head at its outer end, said cross-head having open ended slots at its opposite ends, said power unit having stationary lateral extensions at its forward end provided with open ended slots corresponding substantially to the slots in said cross-head in the plunger element, a separate spider element having means for detachably fastening it to a rod line section or the like to be pulled, said spider element having oppositely disposed extensions, and draft chains attached at one end to said extensions of the spider element, said draft chains being extended rearwardly from the spider element and secured intermediate their length in the slotted end portions of said cross-head on the plunger element and the portions of said chains rearward of said cross-head being detachably secured in the slotted portions of said lateral extensions on the power unit.

6. The herein described pulling apparatus for rod lines and the like, comprising a hydraulic power unit to be disposed and supported horizontally when in use and having a rear head element formed with a lateral supporting extension, said supporting extension having a tapered slip-seating opening therein and a communicating lateral opening for the passage of a rod section transversely into said slip-seating opening, removable sectional slip elements for fastening the rod in the slip-seating opening, and a forward head element having a lateral extension aligned with said slip-seating opening of the rear head element whereby to support the forward portion of the unit and also laterally receive and loosely support the adjacent portion of the rod line section.

7. The herein described pulling apparatus for rod lines and the like, comprising a hydraulic power unit to be disposed and supported horizontally when in use and having a rear head element formed with a lateral supporting extension, said supporting extension having a tapered slip-seating opening therein and a communicating lateral opening for the passage of a rod section transversely into said slip-seating opening, removable sectional slip elements for fastening the rod in the slip-seating opening, and a forward head element having a lateral extension aligned with said slip-seating opening of the rear head element whereby to support the forward portion of the unit and also laterally receive and support the adjacent portion of the rod line section, a longitudinal reciprocatory plunger element in said unit, said plunger projecting beyond the forward end of the unit, a flexible draft element detachably and adjustably connected to the forward end portion of said plunger element, and a puller element attached to said draft element and having provision for releasable attachment to a rod line section to be thereby pulled.

CLARENCE D. HALL.
ERCY A. MORSE.